United States Patent
Klein et al.

(10) Patent No.: US 7,523,233 B1
(45) Date of Patent: Apr. 21, 2009

(54) SYSTEM AND METHOD OF TUNNELING SAS-EXTENDER DISCOVERY THROUGH A FIBRE-CHANNEL FABRIC

(75) Inventors: Craig A. Klein, Tucson, AZ (US); Timothy Allen Johnson, Tucson, AZ (US); Louie A. Dickens, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/025,994

(22) Filed: Feb. 5, 2008

(51) Int. Cl.
*G06F 13/12* (2006.01)
*G06F 11/00* (2006.01)

(52) U.S. Cl. ............................................. 710/62; 714/2
(58) Field of Classification Search ............... 710/62, 710/63, 64; 714/2
See application file for complete search history.

(56) References Cited

U.S. PATENT DOCUMENTS

| | | | |
|---|---|---|---|
| 6,138,161 A * | 10/2000 | Reynolds et al. | ............ 709/227 |
| 6,209,023 B1 | 3/2001 | Dimitroff et al. | |
| 7,085,903 B2 | 8/2006 | Johnson et al. | |
| 7,257,730 B2 | 8/2007 | Spry | |
| 2005/0088979 A1* | 4/2005 | Mehra | ........................ 370/254 |
| 2005/0188239 A1* | 8/2005 | Golasky et al. | ................ 714/2 |
| 2005/0281261 A1 | 12/2005 | Zur et al. | |
| 2007/0073909 A1 | 3/2007 | Gasser | |
| 2007/0294572 A1* | 12/2007 | Kalwitz et al. | .................. 714/9 |
| 2008/0010530 A1* | 1/2008 | Davies et al. | .................. 714/31 |

FOREIGN PATENT DOCUMENTS

WO    WO2006025840 A2    3/2006

OTHER PUBLICATIONS

Resolve IP Fragmentation, MTU, MSS, and PMTUD Issues with GRE and IPSEC, Oct. 2, 2006, Cisco.*
GRE Tunnel Keepalives, Aug. 20, 2005, Cisco.*
DeSanti et al., RFC4438—Fibre-Channel Name Server MIB, Apr. 2006, Network Working Group.*
DeSanti et al., RFC4983—Fibre Channel Registered State Change Notification, Aug. 2007, Network Working Group.*

* cited by examiner

*Primary Examiner*—Alford W Kindred
*Assistant Examiner*—Hyun Nam
(74) *Attorney, Agent, or Firm*—MaxValue IP, LLC

(57) ABSTRACT

An embodiment of invention is a method of tunneling Serial Attached SCSI (SAS) extender discovery through a Fibre Channel (FC) fabric. The SAS interfaces on the SAS extender are initialized first. The FC links are then brought up and device routing table is built. Then a check is made to determine if any SAS devices are connected to the extender. If a SAS device is connected, extender registers its ID with a unique FC4 type as SAS tunneling device in the FC fabric nameserver, and queries discovery of the same device types. If another device of the same type is found, the local extender logs into remote extender through the FC fabric, performs a discovery and identifies all the SAS devices in the remote site, to identify all the devices and route traffic.

1 Claim, 7 Drawing Sheets

SYSTEM AND METHOD OF TUNNELING SAS-EXTENDER DISCOVERY THROUGH A FIBRE-CHANNEL FABRIC

BACKGROUND OF THE INVENTION

Serial Attached SCSI (SAS) is the next generation of the Small Computer System Interface (SCSI), used for connecting storage devices to a computer system. It has been developed as an alternative to the Fibre Channel interface (FC), offering similar performance and reduced cost, at the expense of connectivity and scalability.

Tunneling through a Fibre Channel link with SAS traffic introduces the problem of discovery of the SAS devices when a new tunneling extender is introduced into a Fibre Channel fabric. The SAS devices attached to the new tunneling extender will not be visible to the other SAS devices attached to other remote SAS extenders without a new process for initiating discovery.

SUMMARY OF THE INVENTION

In one embodiment of the invention, the SAS interfaces on the SAS extender are initialized first. The Fibre Channel (FC) links are then brought up and device routing table is built. Then a check is made to determine if any SAS devices are connected to the extender. If no SAS devices are connected to the extender over the SAS ports, then the process waits for a Broadcast Change (BC) primitive, indicating a change has occurred. If a BC primitive is not received, the extender continues to wait. If a BC primitive is received, SAS discovery is performed again.

In one embodiment, if SAS devices are discovered on at least one of the extender SAS links, extender logs into the FC fabric over the FC link, then does a port login into the fabric nameserver, and registers for State Change Notification (SCN), then the extender registers its ID with the fabric nameserver as a FC device with a unique fibre channel FC4 type indicating that it is a SAS tunneling extender. The SAS extender then queries the FC fabric nameserver for any other SAS tunneling extenders with the same FC4 type. At this point, the embodiment checks the results of the query to determine if another SAS tunneling extender is present.

In one embodiment, if another device is found, the extender does a port login to the remote extender, issues a SAS Broadcast Change (BC) primitive that has been encapsulated in a fibre channel frame to the remote SAS extender. The BC primitive is passed to any SAS devices that are attached to the remote extender, causing any remotely attached SAS initiator(s) to perform SAS discovery. Any SAS devices that are attached to the SAS extender will be discovered by the remote SAS extender during this discovery process. At this point, encapsulated SAS traffic can then flow through the FC link between the two SAS extenders. If SAS traffic is detected, depending on the type of the traffic, it is either encapsulated and send over the FC to the remote extender or un-encapsulated from the remote extender and send to the proper port.

In one embodiment, if no device is found, the process waits for Report State Change Notification (RSCN). If RSCN is not detected, the process continues to wait. If RSCN is detected, the process goes through the discovery steps as mentioned in second paragraph above.

DETAILED DESCRIPTION OF THE PREFERRED EMBODIMENTS

Figure 1:
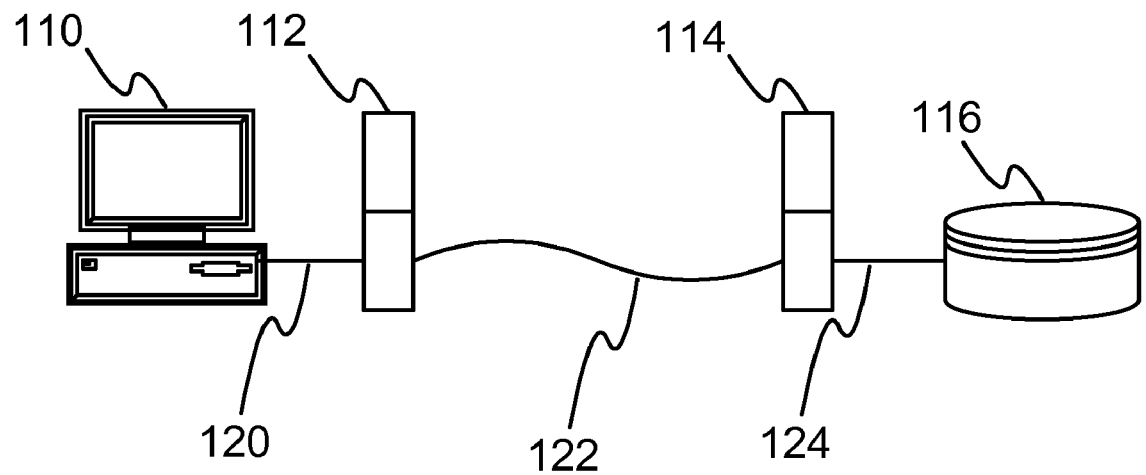
FIG. 1 is an example of a distributed SAS storage system connected through Fibre Channel.

One embodiment of invention teaches the configuration management process which allows SAS devices to discover other SAS devices through a Fibre Channel fabric. An example of this application is an SAS storage system which is depicted in FIG. 1.

Initiator 110 is connected via SAS interface 120 to a SAS Extender 112, which is connected to remote SAS Extender 114 via a Fibre Channel link 122, which is in turn connected to target storage device 116 via SAS interface 124. Fibre Channel link 122 may be physically kilometers long, allowing data from initiator 110 to be stored remotely on target 116. Initiator 110 and target 116 operate as if the Fibre Channel link 122 and the SAS extenders 112 and 114 are not in the connection, and the link is purely a SAS link.

Link 122 may be hundreds of kilometers long, versus links 120 and 124 which are limited to 10 meters long. Links 120 and 124 may alternately be Serial Advance Technology Attachment (SATA). Link 122 may alternately be Ethernet.

Figure 2:
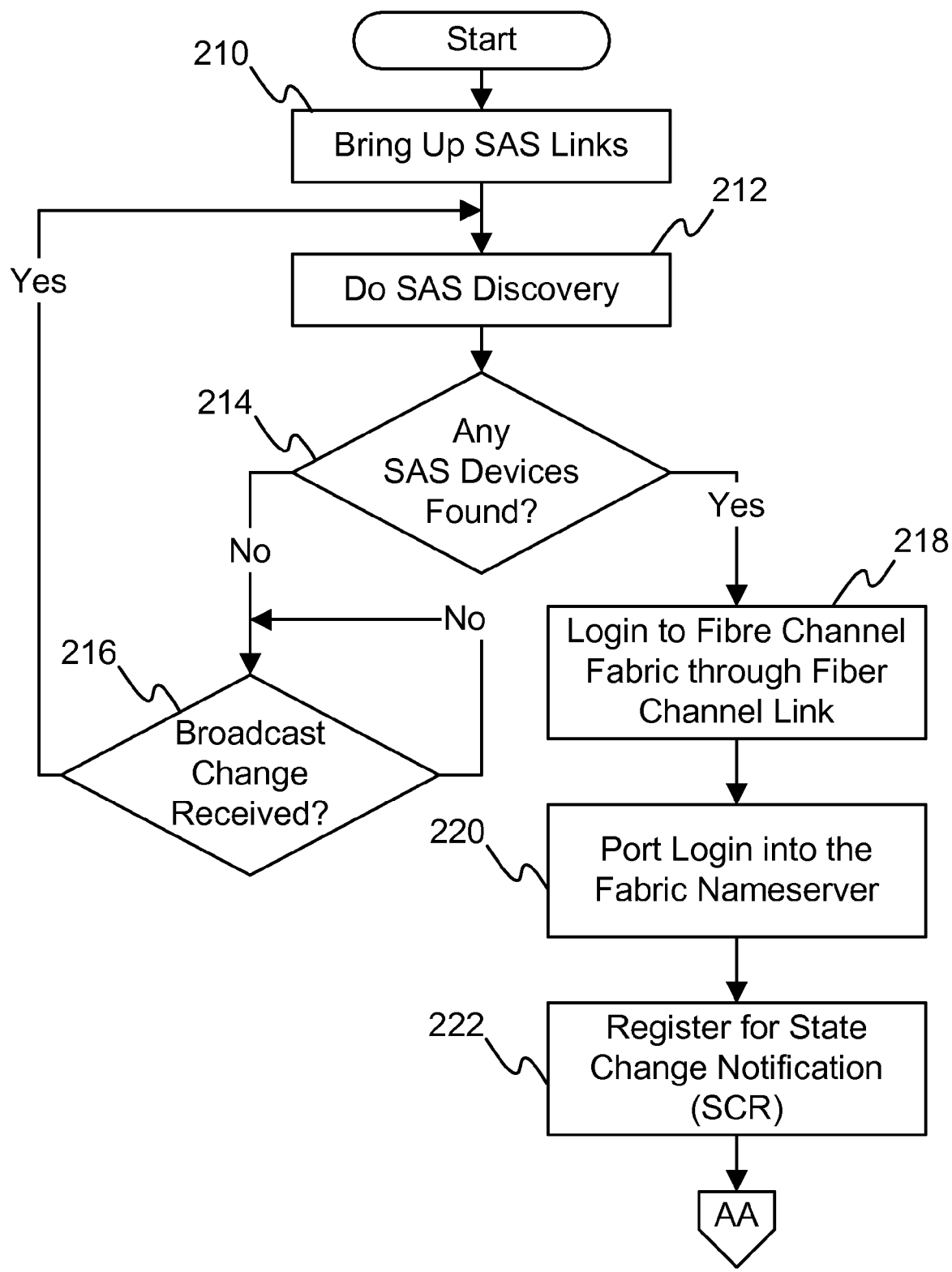
FIG. 2 is the flow diagram of the configuration and SAS discovery on the local SAS extender.

Referring to FIG. 2, in one embodiment, the configuration process begins at 210, where the SAS extender brings up its SAS ports as known in the art. The process then continues to step 212, where SAS discovery is performed and the device routing table is built. A check is then made in step 214 to determine if any SAS devices are connected to the extender. If no SAS devices are connected to the extender over the SAS ports, then the process continues at step 216, where the extender waits for a Broadcast Change primitive, indicating a change has occurred on a SAS link. If a Broadcast change primitive is not received, the extender continues to look for a Broadcast Change. If a Broadcast Change primitive is received, the process returns to step 212, where SAS discovery is performed again.

In one embodiment, if in step 214 SAS devices are discovered on at least one of the extender SAS links, the process moves to step 218, where the extender logs into the Fibre Channel fabric over the Fibre Channel link. The process flows to step 220, where the extender does a port login into the fabric nameserver. The extender then registers with the Fibre Channel nameserver for State Change Notification (SCN) in step 222, so that if there is a configuration change on the fabric, the extender is notified. In one embodiment, this is a State Change Registration frame (SCR).

Figure 3:
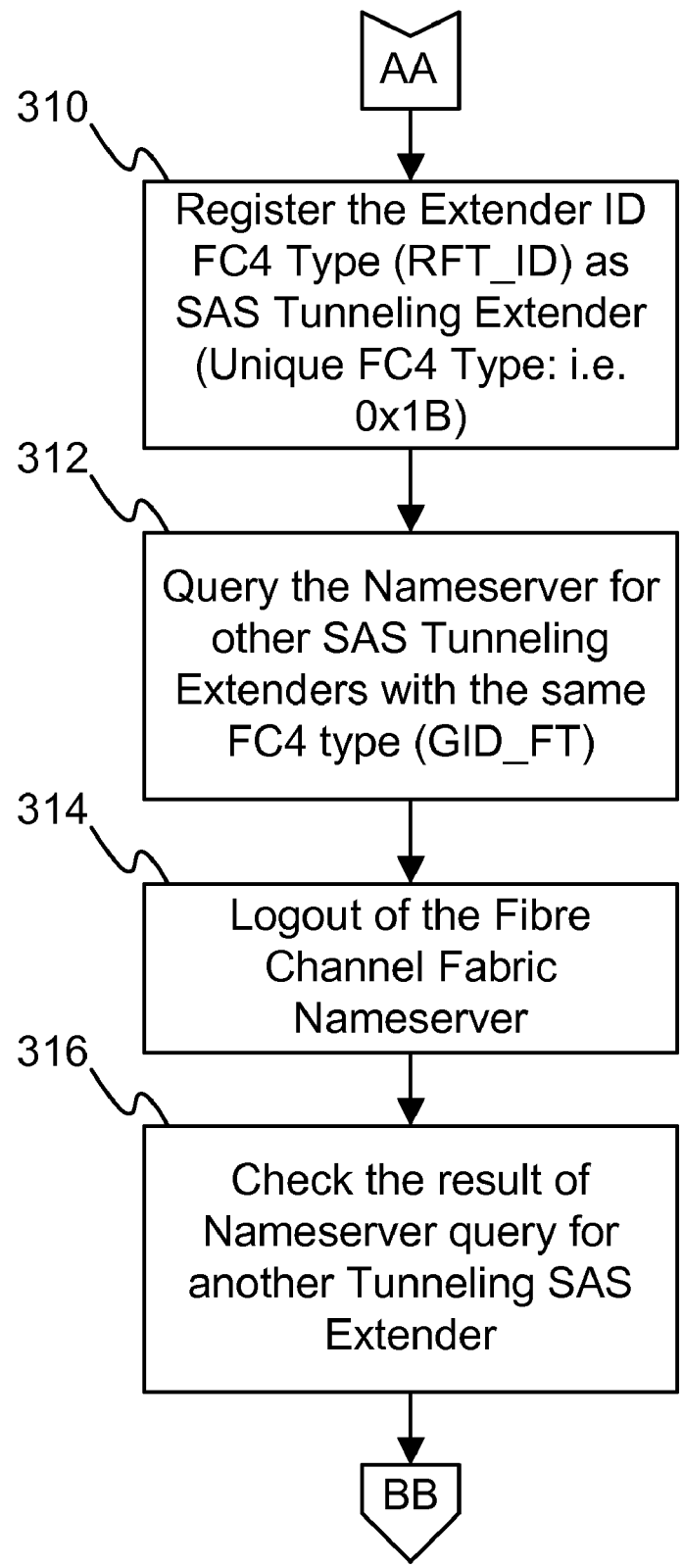
FIG. 3 is the flow diagram of the registration of the local SAS extender with Fiber Channel nameserver fabric with the new ID type and query for the same extender types.

Referring to FIG. 3, in one embodiment, the process continues at step 310, where the extender registers its ID (RFT_ID) with the fabric nameserver as a Fibre Channel device with a unique Fibre Channel FC4 type indicating that it is a SAS tunneling extender. In one embodiment, the FC4 type is 0x1B. The process then moves to step 312, where the SAS extender queries (GID_FT) the Fibre Channel fabric nameserver for any other SAS tunneling extenders with the same FC4 type. The process then flows to step 314, where it logs out of the fabric nameserver. In step 316, the process then checks the results of the nameserver query to determine if other SAS tunneling extenders are present on the Fibre Channel fabric.

Figure 4:
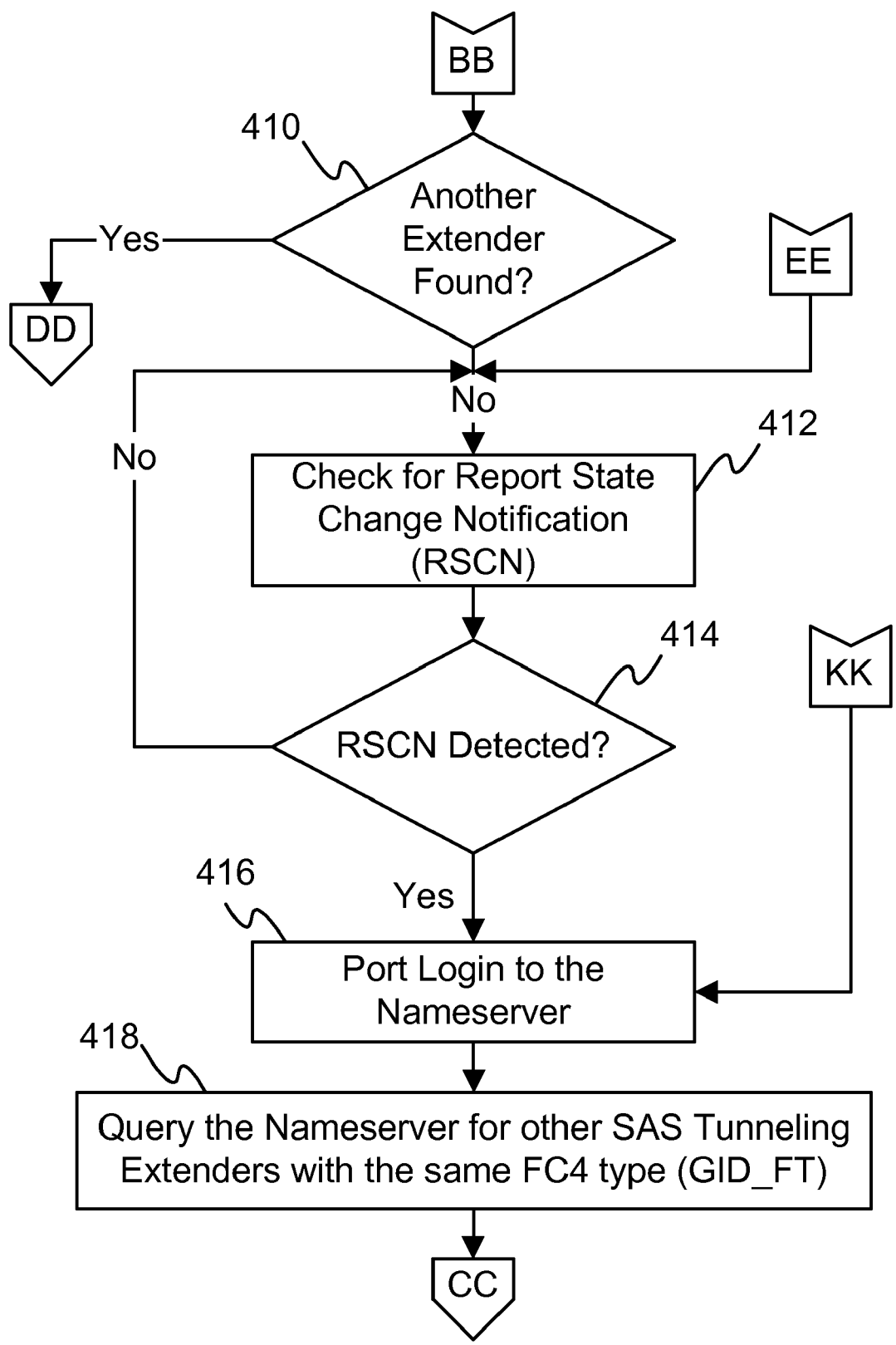
FIG. 4 is the flow diagram of finding another extender of the type or waiting for RSCN.
Figure 5:
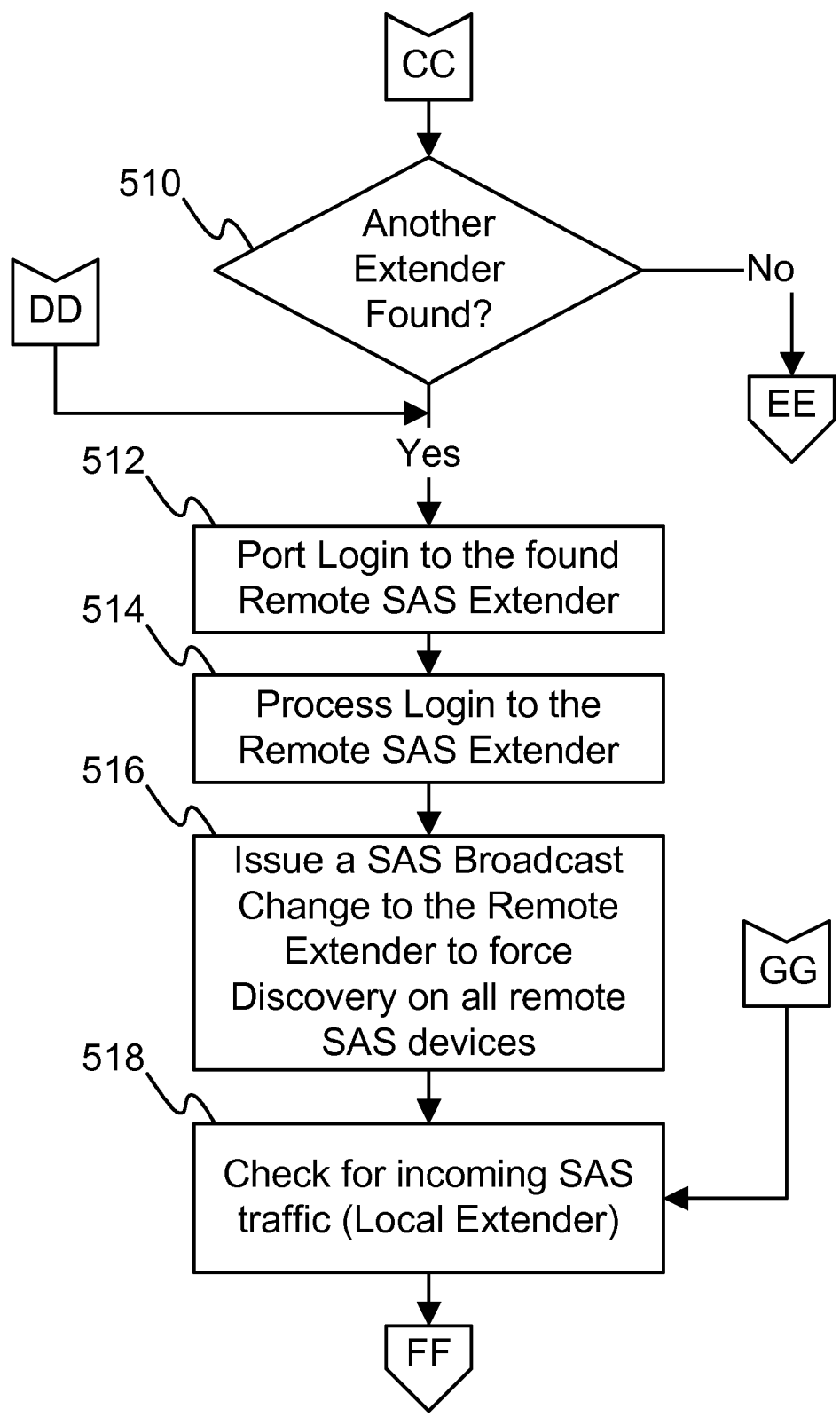
FIG. 5 is the flow diagram of processing when another remote tunneling extender is found.

Referring to FIG. 4, in one embodiment, if another extender is found (Step 410), then the process moves to FIG. 5, step 512. If in step 410 no other SAS tunneling extenders are found, then the process moves to step 412, where the SAS extender looks for a Report State Change Notification (RSCN) on the fibre channel link, indicating that a configuration change has occurred on the Fibre Channel fabric. If a Fibre Channel Report State Change Notification is not received (Step 414), then the process returns to step 412 to continue waiting. If in step 414 an RSCN is detected, then process moves to step 416, where the extender performs a port login to the fabric nameserver. In one embodiment, the SAS extender then queries (GID_FT) the nameserver again in step 418, looking for another SAS tunneling extender with the same FC4 type.

Referring to FIG. 5, in one embodiment, in step 510, if no other devices are found of the same FC4 type, then the process returns to FIG. 4, step 412 to wait for another RSCN. If in step 510 a remote SAS tunneling extender is discovered with the same FC4 type, the process flows to step 512, where the extender performs a port login to the remote SAS extender. The process continues at step 514, where the extender does a process login to the remote extender. The process moves then to step 516, where the SAS extender issues a SAS Broadcast Change primitive that has been encapsulated in a Fibre Channel frame to the remote SAS extender. The Broadcast Change primitive is passed to any SAS devices that are attached to the remote extender, causing any remotely attached SAS initiator (s) to perform SAS discovery. Any SAS devices that are attached to the SAS extender will be discovered by the remote SAS extender during this discovery process. The process then moves to step 518. At this point in the process SAS tunneling extender has discovered a remote SAS tunneling extender and has successfully logged into the remote extender. SAS discovery has taken place and encapsulated SAS traffic can then flow through the Fibre Channel link between the two SAS extenders. At this step (Step 518), the SAS extender checks for incoming SAS traffic received from the SAS ports.

Figure 6:
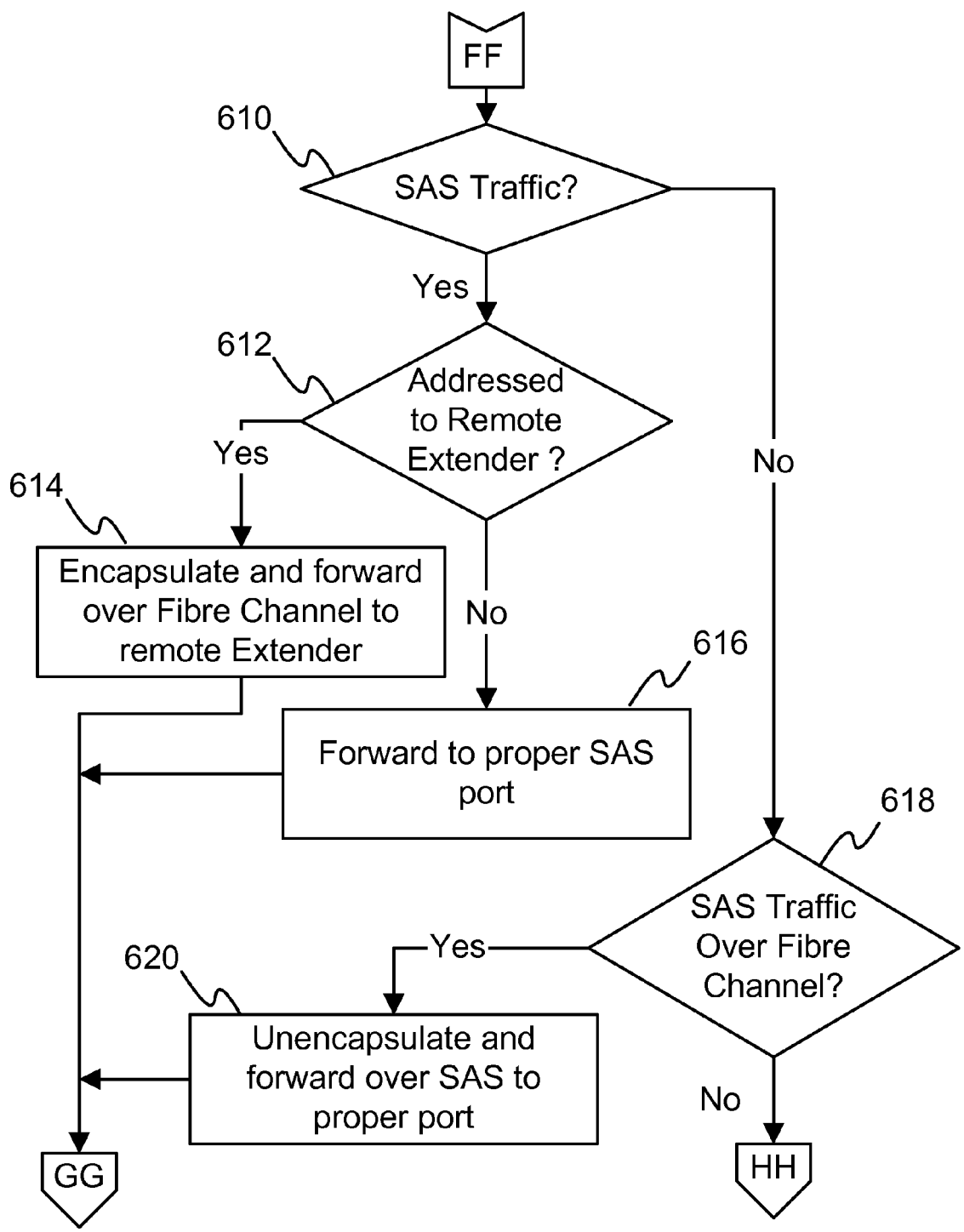
FIG. 6 is the flow diagram of processing traffic on the local SAS extender.

Referring to FIG. 6, in one embodiment, at step 610, if SAS traffic is locally generated the process is transitioned to step 612. If this traffic is addressed to a SAS device that is attached to the remote SAS extender via the Fibre Channel link, the traffic is encapsulated and forwarded over the Fibre Channel link to the remote extender (step 614). The process then returns to FIG. 5, step 518. In one embodiment, if in step 612 the SAS traffic received is not addressed to a remotely attached device, the SAS traffic is forwarded to the appropriate local SAS port as known in the art (step 616). The process then returns to FIG. 5, step 518.

In one embodiment, if in step 610 there is no SAS traffic received on any of the SAS ports, then the process flows to step 618, where it checks for encapsulated SAS traffic received on the fibre channel port from the fibre channel fabric. If SAS traffic is received over the FC link, the process moves to step 620, and the SAS traffic is un-encapsulated and forwarded to the appropriate SAS port connecting to the addressed SAS device. The process then returns to FIG. 5, step 518.

Figure 7:
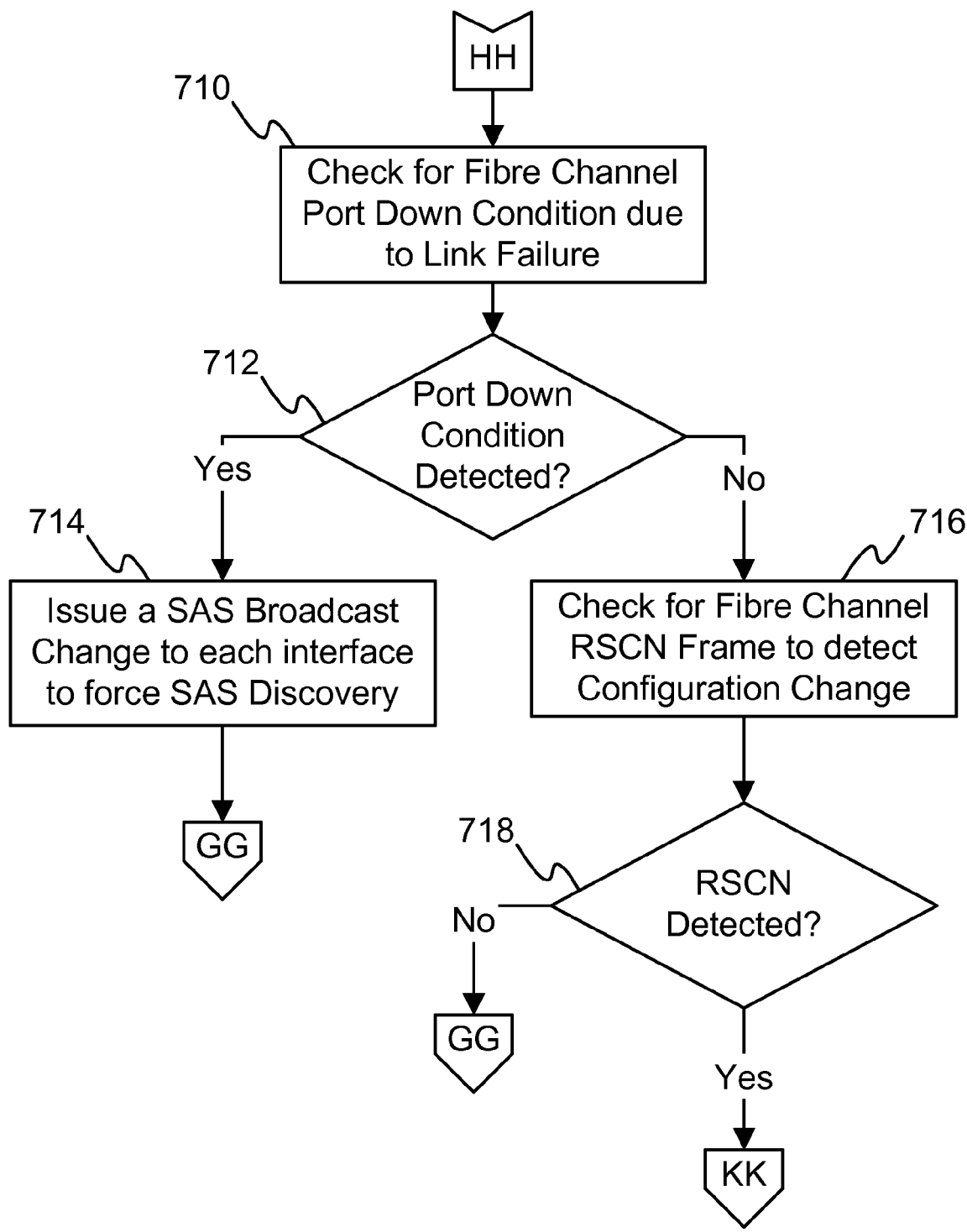
FIG. 7 is the flow diagram of port down and link failure processing.

In one embodiment, if in there is no encapsulated SAS traffic received from the Fibre Channel fabric, the process transitions to FIG. 7, step 710.

Referring to FIG. 7, the process continues at step 710, where it checks for a fibre channel port down condition due to a link failure. If the Fibre Channel link has transitioned to a failed state (step 712), the process goes to step 714, where the SAS extender sends a Broadcast Change SAS primitive to each SAS interface, initiating SAS discovery. The process then returns to FIG. 5, step 518. This notifies all local SAS devices that all remote SAS devices may have changed. If in step 712 it was determined that the Fibre Channel port is still operational, the process continues at step 716, where it checks for a Fibre Channel RSCN frame indicating that the fabric configuration has changed. If in step 718, RSCN frame is detected, this transitions the process to return to FIG. 4, step 416 to check fabric nameserver for SAS extenders and rebuild its configuration table. If in step 718, no RSCN frame was detected, the process transitions back to FIG. 5, step 518 and waiting for SAS traffic.

One embodiment of the invention is a method of tunneling serial attached small computer system interface extender discovery through a fibre-channel fabric, the method comprising:

A first serial attached small computer system interface extender checking for a fibre channel report state change notification frame on a fibre channel link; the fibre channel report state change notification indicating that a fabric configuration has changed; wherein the first serial attached small computer system interface extender having a first fibre channel interface and a third interface; wherein a second serial attached small computer system interface extender having a second fibre channel interface and a fourth interface; wherein the first fibre channel interface and the second fibre channel interface are connected via said fibre channel link;

The first serial attached small computer system interface extender performing discovery on first ports, if the first serial attached small computer system interface extender bringing up the first ports, or if the first serial attached small computer system interface extender receiving a broadcast change primitive on a first link; In case of performing the discovery, if these are no serial attached small computer system interface devices discovered, then monitoring the first link for the broadcast change primitive;

In case of performing the discovery, if a serial attached small computer system interface devices is discovered, or if the first serial attached small computer system interface extender receives the fibre channel report state change notification, then the first serial attached small computer system interface extender performing the following: logging in to a fibre channel fabric, logging in into a fabric nameserver, registering with the fabric nameserver for the fibre channel report state change notification, registering an identification code with the fabric nameserver as a fibre channel device with a unique first fibre channel type, indicating a tunneling extender, querying the fabric nameserver for any other tunneling extenders with the same first fibre channel type, in case of having no other tunneling extender, monitoring for the fibre channel report state change notification on the fibre channel link, in case of having a tunneling extender, logging in a remote extender, issuing the broadcast change primitive, encapsulated in a fibre channel frame, to the remote extender via the fibre channel link, passing the broadcast change primitive to any device that is attached to the remote extender, a remotely attached initiator performing discovery, discovering any device that is attached to the first serial attached small computer system interface extender, and rebuilding a configuration table;

The first serial attached small computer system interface extender checking for fibre channel port down condition due to a link failure; and in case of the fibre channel port down condition, the first serial attached small computer system interface extender sending the broadcast change primitive to its corresponding interfaces, initiating discovery, and notifying all local devices that all remote devices may have changed.

A system, apparatus, or device comprising one of the following items is an example of the invention: serial attached small computer system interface extender, fibre-channel fabric, state change notification frame, fibre channel link, fabric configuration, fibre channel interface, port, broadcast change primitive, link, fabric nameserver, identification code, tunneling extender, initiator, SAS device, configuration table, SAS event, or any software, applying the method mentioned above, for purpose of invitation or tunneling serial attached small computer system interface extender discovery through a fibre-channel fabric.

Any variations of the above teaching are also intended to be covered by this patent application.

The invention claimed is:

1. A method of tunneling serial attached small computer system interface extender discovery through a fibre-channel fabric, said method comprising:

a first serial attached small computer system interface extender checking for a fibre channel report state change notification frame on a fibre channel link, wherein said fibre channel report state change notification indicates that a fabric configuration has changed;

wherein said first serial attached small computer system interface extender having a first fibre channel interface and a third serial attached small computer system interface type interface;

wherein a second serial attached small computer system interface extender having a second fibre channel interface and a fourth serial attached small computer system interface type interface;

wherein said first fibre channel interface and said second fibre channel interface are connected via said fibre channel link;

said first serial attached small computer system interface extender performing discovery on first ports, if said first serial attached small computer system interface extender bringing up said first ports, or if said first serial attached small computer system interface extender receiving a broadcast change primitive on a first serial attached small computer system interface type link;

in case of performing said discovery, if there is no serial attached small computer system interface device discovered, then monitoring said first serial attached small computer system interface link for said broadcast change primitive;

in case of performing said discovery, if a serial attached small computer system interface device is discovered, or if said first serial attached small computer system interface extender receives said fibre channel report state change notification, then said first serial attached small computer system interface extender performing the following:

logging in to a fibre channel fabric, if not already logged in to said fibre channel fabric, logging in into a fabric nameserver, registering with said fabric nameserver for said fibre channel report state change notification, if not already registered with said fabric nameserver for said fibre channel report state change notification, registering an identification code with said fabric nameserver as a fibre channel device with a unique first fibre channel type, indicating a tunneling extender, if not already registered said identification code with said fabric nameserver as said fibre channel device with said unique first fibre channel type, querying said fabric nameserver for any other tunneling extenders with the first fibre channel type, in case of having no other tunneling extender, monitoring for said fibre channel report state change notification on said fibre channel link, in case of having a tunneling extender,
logging in a remote extender,
issuing said broadcast change primitive, encapsulated in a fibre channel frame, to said remote extender via said fibre channel link,
passing said broadcast change primitive to any device that is attached to said remote extender,
a remotely attached initiator performing discovery,
discovering any serial attached small computer system interface device attached to said first serial attached small computer system interface extender, and
rebuilding a configuration table;

said first serial attached small computer system interface extender checking for fibre channel port down condition due to a link failure;

in case of said fibre channel port down condition,
said first serial attached small computer system interface extender sending said broadcast change primitive to its corresponding interfaces,
initiating discovery, and
notifying all local devices that all remote devices may have changed;

checking for a first traffic of serial attached small computer system interface type from said first ports, and encapsulating and forwarding said first traffic to said remote extender via said fibre channel link, if said first traffic is addressed to a serial attached small computer system interface device attached to said remote extender; and checking for a second encapsulated traffic of serial attached small computer system interface type received on said fibre channel port via said fibre channel fabric, and un-encapsulating and forwarding said second encapsulated traffic to a port among said first ports which is connected to a receiving serial attached small computer system interface device, if said second traffic is addressed to said receiving serial attached small computer system interface device.

* * * * *